United States Patent Office 3,342,818
Patented Sept. 19, 1967

3,342,818
DISPERSE DYES OF THE PHTHALOPERINONE
SERIES
Ernst Schefczik, Ludwigshafen (Rhine), Germany, assignor to Badische Anilin- & Soda-Fabrik Aktiengesellschaft, Ludwigshafen (Rhine), Germany
No Drawing. Filed Apr. 6, 1965, Ser. No. 446,094
Claims priority, application Germany, Apr. 16, 1964,
B 76,361; Mar. 17, 1965, B 81,007
5 Claims. (Cl. 260—251)

This invention relates to new dyes of the phthaloperinone series which are outstandingly suitable for dyeing textile materials of synthetic linear polyesters.

It is known from U.S. patent specification No. 2,955,902 that phthaloperinone gives fast dyeings on polyester fibers. Dyeings thus obtained are distinguished by good light fastness and fastness to dry heat pleating and setting. Owing to the more stringent requirements as to the fastness properties of disperse dyes, particularly a high fastness to dry heat pleating and setting, such as is necessary in the case of colored fabrics which are to be pleated, the fastness properties of the said dyes are, however, inadequate.

It is the object of the present invention to provide dyes which are superior to phthaloperinone and halogenated phthaloperinones in light fastness and particularly in fastness to dry heat pleating and setting.

This object is achieved in accordance with this invention by dyes having the general formula:

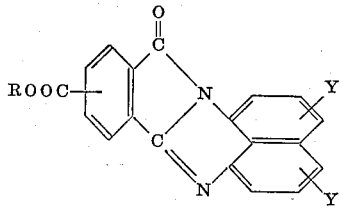

in which each Y denotes a hydrogen atom or a chlorine atom, R denotes a hydrogen atom or an aliphatic radical having one to eighteen carbon atoms and free from ionic water-solubilizing groups, and the group COOR is attached to the carbon atom 12 or 13 of the phthaloperinone.

Ionic water-solubilizing groups include for example carboxylic acid groups and particularly sulfonic acid groups. The aliphatic radicals may be linear or branched alkyl radicals whose chain may also ge interrupted by oxygen atoms or sulfur atoms. Particularly suitable as the radical R, however, are radicals of an aliphatic diol of the type of hexanediol-1,6, butanediol-1,4, triglycol, thiodiglycol, pentanediol-1,4, 2,2-diethylhexanediol-1,3 and the second hydroxyl group may also be etherified or esterified. Dyes of this type are the dyes having the formula:

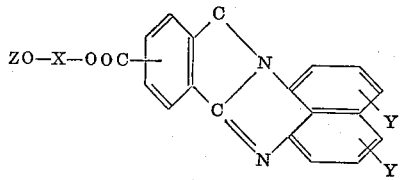

where Y has the meanings specified above, X represents an alkylene group having 2 to 10 carbon atoms and Z represents a hydrogen atom or an alkyl group having 1 to 4 carbon atoms.

Dyes according to the invention are obtained by condensing trimellitic acid or an acid derivative of trimellitic acid which is capable of condensing under the reaction conditions, with 1,8-diaminonaphthalene or chlorinated 1,8-diaminonaphthalene and if desired chlorinating and/or esterifying the phthaloperinone carboxylic acid obtained.

Suitable acid derivatives of trimellitic acid which are capable of condensing with aromatic amines under the reaction conditions are functional derivatives, such as the esters with low molecular weight alcohols and preferably trimellitic anhydride.

The dyes are prepared by conventional methods by heating trimellitic acid or a derivative thereof, such as trimellitic anhydride, with 1,8-diaminonaphthalene in an organic solvent, such as nitrobenzene, halobenzenes, pyridine, dimethylformamide, N-methylpyrrolidone, or in mixtures of these solvents or in water under pressure. Surprisingly it is not a mixture of two isomers which is formed but a uniform compound having a sharp melting point; neither the condensation product formed nor the esterification product can be separated into their components.

In order to prepare chlorinated compounds the starting material may either be chlorinated 1,8-diaminonaphthalenes or phthaloperinone carboxylic chlorides or phthaloperinone carboxylic esters may be chlorinated.

Perinone carboxylic acids obtained according to this invention may if desired be esterified by conventional methods, for example by heating with alcohols in the presence of acids or by conversion into the acid chlorides and reaction of the acid chlorides with alcohols, if necessary in the presence of basic reagents.

Examples of alcohols for the production of the esters are: methanol, ethanol, propanol, butanol, decanol, 2-ethylhexanol, ethylene glycol, ethylene glycol monomethyl ether, ethylene glycol monobutyl ether, ethylene glycol monoacetate, diglycol, diglycol monopropyl ether, triglycol, triglycol monoethyl ether, ethylene chlorohydrin, glycerol-α-chlorohydrin, 2,2,3,3 - tetrachloropropanol, 3-chloropropanol, 4-bromobutanol, propylene glycol-1,2, glycerol, butanediol-1,4, hexanediol-1,6, neopentyl glycol, pentaerythritol, pentaerythritol dichlorohydrin, thiodiglycol, benzyl alcohol, phenyl ethyl alcohol, N,N-dimethylethanolamine, β-oxypropionic acid ester or glycolic esters.

When a diol is used, the free hydroxyl group of the phthaloperinone carboxylic ester may be subsequently esterified with a low molecular weight fatty acid, such as acetic acid, propionic acid or monochloroacetic acid.

The dyes obtainable according to the invention are suitable for dyeing and printing textile material, such as fibers and cloth of synthetic linear polyamides, polyurethanes and synthetic linear polyesters from an aqueous liquor and yield scarlet dyeings and prints which are distinguished by very good fastness, particularly outstanding light fastness and very good fastness to dry heat pleating and setting.

The following examples will further illustrate the invention. The parts and percentages given in the examples are by weight. Parts by volume bear the same relation to parts by weight as the liter (S.T.P.) to the kilogram. Unless otherwise stated, all the dyes in the examples give fast scarlet dyeings on polyester fibers.

EXAMPLE 1

(a) 420 parts of trimellitic anhydride is dissolved in a mixture of 1000 parts by volume of N-methylpyrrolidone and 1000 parts by volume of nitrobenzene with heating. A solution of 316 parts of 1,8-diaminonaphthalene in 800 parts by volume of nitrobenzene is added thereto in one batch. The mixture is boiled for six hours with a descending condenser, water and any solvent being distilled off. Upon cooling the whole to room temperature, phthaloperinone carboxylic acid-12 (or 13) crystallizes out. It is suction filtered, washed with alcohol and dried. 607 parts of the dye is obtained as red crystals having a melting point of 340° to 341° C.

(b) 420 parts of trimellitic anhydride is dissolved in 1800 parts of nitrobenzene. A solution of 316 parts of 1,8-diaminonaphthalene in 1200 parts of nitrobenzene is added during the course of two hours while stirring to the solution which is heated to 200° C. and the water of reaction is distilled off. The temperature is kept at 200° C. for four hours, allowed to cool and suction filtered. After the product has been washed with alcohol and dried, 621 parts of phthaloperinone carboxylic acid is obtained in the form of small red crystals. The compound melts at 340° to 341° C.

(c) A mixture of 220 parts of trimellitic anhydride, 158 parts of 1,8-diaminonaphthalene and 1500 parts of water is heated in a stirred iron autoclave for twelve hours at 200° C. A red suspension is obtained. The dye is isolated by suction filtration, washing with hot water and drying. The yield is 313 parts of phthaloperinone carboxylic acid.

(d) 238 parts of monoethyl trimellitate (melting point 225° C.) and 158 parts of 1,8-diaminonaphthalene are heated in 600 parts of nitrobenzene for four hours at 200° to 210° C. with a descending condenser. A mixture of water, ethyl alcohol and nitrobenzene thus distills off. The reaction mixture, while still at 90° C., is suction filtered and the filter residue is washed with alcohol, 306 parts of phthaloperinone carboxylic acid is obtained.

EXAMPLE 2

31.4 parts of phthaloperinone carboxylic acid (Example 1) is boiled in 300 parts by volume of chlorobenzene and 1 part by volume of dimethylformamide under reflux. Phosgene is then passed in until a clear solution has been formed. The solution is cooled while passing dry nitrogen therethrough in order to expel excess phosgene. The reaction mixture solidifies to a mash of red crystals. These are suction filtered, washed with benzene and dried. 31.9 parts of phthaloperinone carboxylic chloride having a melting point of 214° to 215° C. is obtained.

The acid chloride need not be isolated for reaction with alcohols. The alcohol to be reacted may be added to a hot solution or cold suspension of the acid chloride in chlorobenzene (Example 3).

EXAMPLE 3

25 parts of anhydrous ethanol is allowed to flow gradually into the solution of phthaloperinone carboxylic chloride in chlorobenzene obtained according to Example 2 at 90° C. and the whole boiled under reflux for two hours. Upon cooling, the ester crystallizes out. 30.6 parts of ethyl phthaloperinone carboxylate is obtained having a melting point of 179° to 180° C.

EXAMPLE 4

A mixture of 33.3 parts of phthaloperinone carboxylic chloride (Example 2) and 500 parts by volume of methanol is boiled for two hours, and cooled to room temperature. The product is suction filtered and washed with methanol. 30 parts of methyl phthaloperinone carboxylate is obtained having a melting point of 199° to 200° C.

EXAMPLE 5

33.3 parts of phthaloperinone carboxylic chloride, 250 parts by volume of n-propanol and 20 parts by volume of pyridine are stirred at 60° C. for four hours. The mixture is cooled to room temperature and the product is suction filtered, washed with methanol and then washed with water. After having been dried, 34.1 parts of n-propyl phthaloperinone carboxylate having a melting point of 167° to 168° C. is obtained.

EXAMPLE 6

33.3 parts of phthaloperinone carboxylic chloride, 500 parts by volume of chloroform, 12 parts by volume of pyridine and 30 parts of hexanediol-1,6 are boiled under reflux for four hours. A little ammonium chloride is then added and the chloroform is distilled off with steam. The water is poured off and the red residue ground with methanol. The product is suction filtered, washed with methanol and dried. 38.6 parts of ω-hydroxyhexyl phthaloperinone carboxylate is obtained having a melting point of 137° to 139° C.

When butanediol-(1,4) is used instead of hexanediol-(1,6), a dye is obtained having a melting point of 156° to 158° C. This dye, like that in paragraph 1 of this example, may be further esterified by boiling 19.3 parts of the ω-hydroxyhexyl phthaloperinone carboxylate with 2 parts of anhydrous sodium acetate and 150 parts of acetic anhydride for four hours under reflux. After cooling, the precipitate is suction filtered, washed with methanol and water, and dried. 18.9 parts of ω-acetoxybutyl phthaloperinone carboxylate having a melting point of 160° to 165° C. is obtained.

The dye thus obtained gives scarlet dyeings on polyester and polyamide fibers.

EXAMPLE 7

20 parts of pentaerythritol is dissolved in 250 parts of boiling dimethylformamide. 33.3 parts of phthaloperinone carboxylic chloride is added and boiling continued for four hours under reflux. The mixture is poured into 500 parts of hot water and the precipitate is suction filtered and boiled again with water to remove excess pentaerythritol. The product is dried and 39 parts of (β,β,β-trimethylol)ethyl phthaloperinone carboxylate is obtained having a melting point of 276° to 277° C.

EXAMPLE 8

33.3 parts of phthaloperinone carboxylic chloride, 30 parts of stearyl alcohol and 300 parts of dry toluene are boiled for two hours. The red solution is diluted with an equal volume of methanol and cooled with ice. The dye is suction filtered, washed with cold methanol and dried under subatmospheric pressure at 60° C. 52 parts of stearyl phthaloperinone carboxylate is obtained having a melting point of 102° C.

EXAMPLE 9

332.5 parts of phthaloperinone carboxylic chloride, 400 parts of phosphorus pentachloride, 2 parts of pyridine and 800 parts of dry trichlorobenzene are heated to such an extent that the phosphorus trichloride formed distills off through a descending condenser. The whole is then boiled under reflux for sixteen hours, cooled and the mixture diluted with benzene and cyclohexane. The product is suction filtered and dried. 312 parts of a dark red acid chloride is obtained having a chlorine content of 25.6%, corresponding to the introduction of two atoms of chlorine (calculated value 26.5% of chlorine).

40.2 parts of the dichlorophthaloperinone carboxylic chloride thus obtained is boiled in 800 parts of methanol for four hours. The whole is cooled and the product is suction filtered and dried. 38 parts of methyl dichlorophthaloperinone carboxylate having a melting point of 203° to 206° C. is obtained.

EXAMPLE 10

40.2 parts of dichlorophthaloperinone carboxylic chloride, 40 parts of butanediol-(1,4), 8 parts of pyridine and 400 parts of chloroform are boiled for four hours. The chloroform is then distilled off with steam and the dye is suction filtered and washed with dilute alcohol. 42 parts of ω-hydroxybutyl dichlorophthaloperinone carboxylate having a melting point of 115° to 118° C. is obtained.

EXAMPLE 11

40.2 parts of dichlorophthaloperinone carboxylic chloride is introduced in small batches in the course of two hours while stirring into a mixture, heated to 120° C., of 30 parts of hexanediol-(1,6) and 500 parts of dry chlorobenzene. The whole is then boiled under reflux and the chlorobenzene distilled off with steam. The dye is suction filtered and washed with dilute alcohol. 42.8 parts of ω-hydroxyhexyl dichlorophthaloperinone carboxylate is obtained having a melting point of 260° to 262° C.

Other esters of dichlorophthaloperinone carboxylic acid as given in the following table may be obtained by the method described in Examples 9 to 11:

TABLE

| Example No. | R | Prepared according to Example |
|---|---|---|
| 12 | $C_2H_5-$ | 9 |
| 13 | $C_3H_7-$ | 9 |
| 14 | $C_4H_9-$ | 9 |
| 15 | $CH_3OCH_2CH_2-$ | 10 |
| 16 | $HOCH_2-\underset{\underset{C_4H_9}{\vert}}{\overset{\overset{C_2H_5}{\vert}}{C}}-CH_2-$ | 10 |
| 17 | $\underset{H_3C}{\overset{H_3C}{\diagdown}}CH-CH-\underset{\underset{CH_3}{\vert}}{\overset{\overset{CH_3}{\vert}}{C}}-CH_2-$ $\phantom{xxxxxxx}OH$ | 10 |
| 18 | $CH_3CH_2CH_2CH_2\underset{\underset{}{\vert}}{\overset{\overset{C_2H_5}{\vert}}{CH}}-CH_2-$ | 11 |
| 19 | $C_6H_5CH_2CH_2-$ | 10 |

EXAMPLE 20

32.8 parts of methyl phthaloperinone carboxylate is suspended in 400 parts of dry nitrobenzene. A mixture of 28 parts of sulfuryl chloride and 50 parts of dry nitrobenzene is dripped into the suspension at 25° to 30° C. while stirring. The whole is stirred for another four hours at 40° C. and then diluted with a mixture of benzene and cyclohexane. The product is suction filtered, washed and dried. 33 parts of a methyl dichlorophthaloperinone carboxylate is obtained having a melting point of 195° to 200° C. (not sharp); this product is not identical with that described in Example 9.

I claim:
1. A dye of the general formula:

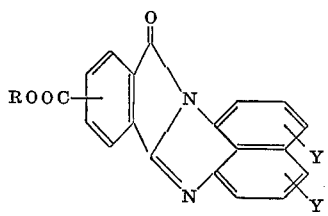

where

Y represents a member selected from the class consisting of a hydrogen atom and a chlorine atom and R represents a member selected from the class consisting of hydrogen and an aliphatic radical being free from ionic water-solubilizing groups and having up to 10 carbon atoms, and where the group —COOR is attached in one of the positions 12 and 13.

2. A dye of the formula:

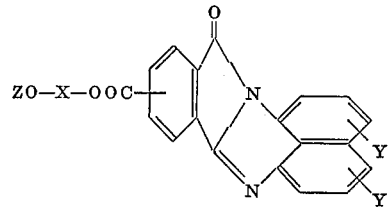

where

Y represents a member selected from the class consisting of a hydrogen atom and a chlorine atom, X represents an alkylene group having 2 to 10 carbon atoms and Z represents a member selected from the class consisting of hydrogen and alkyl having 1 to 4 carbon atoms.

3. The dye of the formula:

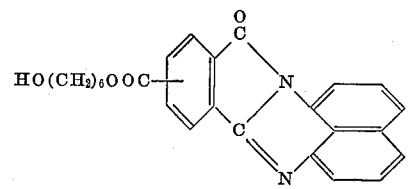

4. The dye of the formula:

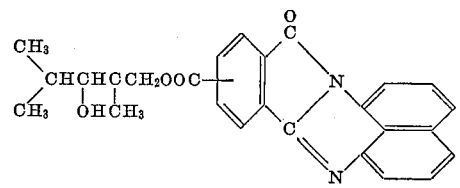

5. The dye of the formula:

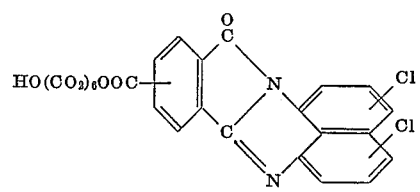

References Cited
FOREIGN PATENTS 730,692  5/1955  Great Britain.

NICHOLAS S. RIZZO, *Primary Examiner.*